(12) United States Patent
Sugano (10) Patent No.: US 11,281,314 B2
(45) Date of Patent: Mar. 22, 2022

(54) METHODS AND APPARATUS FOR VARIABLE CAPACITANCE DETECTION

(71) Applicant: SEMICONDUCTOR COMPONENTS INDUSTRIES, LLC, Phoenix, AZ (US)

(72) Inventor: Takashi Sugano, Kiryu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/947,978

(22) Filed: Aug. 26, 2020

(65) Prior Publication Data

US 2021/0165508 A1    Jun. 3, 2021

Related U.S. Application Data (60) Provisional application No. 62/942,453, filed on Dec. 2, 2019.

(51) Int. Cl.
  *G06F 3/038* (2013.01)
  *G01L 1/14* (2006.01)
  *G06F 3/0354* (2013.01)

(52) U.S. Cl.
  CPC ............ *G06F 3/0383* (2013.01); *G01L 1/144* (2013.01); *G06F 3/03545* (2013.01)

(58) Field of Classification Search
  CPC ..... G06F 3/0383; G06F 3/03545; G01L 1/144
  See application file for complete search history.

(56) References Cited

U.S. PATENT DOCUMENTS

| | | | | |
|---|---|---|---|---|
| 5,629,500 A * | 5/1997 | Fukuzaki | ............ | G06F 3/03545 178/19.07 |
| 5,992,240 A * | 11/1999 | Tsuruoka | ................ | G01L 9/125 73/718 |
| 6,909,313 B2 * | 6/2005 | Youssef | ................. | H01H 9/167 327/147 |
| 7,746,113 B1 * | 6/2010 | Young | .............. | H03K 19/17788 326/80 |
| 7,834,634 B2 * | 11/2010 | Martin | ................... | H01H 9/167 324/418 |
| 8,982,044 B2 * | 3/2015 | Katsurahira | .......... | G06F 3/0383 178/19.02 |
| 9,176,636 B1 * | 11/2015 | Maharyta | ............... | H03K 17/22 |
| 9,459,726 B2 * | 10/2016 | Katsurahira | ........ | G06F 3/03545 |
| 10,019,079 B2 * | 7/2018 | Peretz | ..................... | G06F 3/041 |
| 10,198,094 B1 * | 2/2019 | Sahar | ................. | G06F 3/03545 |
| 10,401,985 B2 * | 9/2019 | Hara | ...................... | G06F 3/0441 |
| 10,921,159 B1 * | 2/2021 | Das | ....................... | G01D 5/2026 |
| 11,099,661 B2 * | 8/2021 | Oda | .................... | G06F 3/04162 |
| 2003/0047360 A1 * | 3/2003 | Katsurahira | ............ | G06F 3/046 178/19.06 |
| 2007/0146351 A1 * | 6/2007 | Katsurahira | ........ | G06F 3/04166 345/179 |
| 2008/0257613 A1 | 10/2008 | Katsurahira | | |

(Continued)

*Primary Examiner* — Grant Sitta
(74) *Attorney, Agent, or Firm* — Dickinson Wright PLLC (57) ABSTRACT

Methods and apparatus for variable capacitance detection may provide various circuits to generate control and/or output signals, measure an elapsed time based on the control and/or output signals, and compute a capacitance value based on the elapsed time, wherein the capacitance value is directly proportional to the elapsed time.

20 Claims, 5 Drawing Sheets

(56) References Cited

U.S. PATENT DOCUMENTS

| | | | |
|---|---|---|---|
| 2009/0065268 A1* | 3/2009 | Katsurahira | G06F 3/03545 178/19.01 |
| 2009/0140728 A1* | 6/2009 | Rollins | G01B 7/023 324/207.16 |
| 2015/0153845 A1* | 6/2015 | Chang | G06F 3/0441 345/179 |
| 2016/0028347 A1* | 1/2016 | Okamoto | H01L 27/1225 331/108 R |
| 2016/0209957 A1 | 7/2016 | Jung | |
| 2017/0003767 A1* | 1/2017 | Holsen | G06F 3/0446 |
| 2017/0005646 A1* | 1/2017 | Hargreaves | G06F 3/00 |
| 2018/0284909 A1* | 10/2018 | Laslo | G06F 3/03545 |
| 2020/0125188 A1* | 4/2020 | Meng | G06F 3/04162 |
| 2020/0379584 A1* | 12/2020 | Ito | G06F 3/0383 |
| 2021/0167787 A1* | 6/2021 | Lesso | H03M 1/0602 |
| 2022/0019300 A1* | 1/2022 | Yamashita | G06F 3/0414 |

* cited by examiner

METHODS AND APPARATUS FOR VARIABLE CAPACITANCE DETECTION

CROSS-REFERENCE TO RELATED APPLICATION

This application claims the benefit of U.S. Provisional Patent Application Ser. No. 62/942,453, filed on Dec. 2, 2019, the contents of which are incorporated by reference.

BACKGROUND OF THE TECHNOLOGY

Capacitive sensors operate by detecting changes in the capacitance formed between two electrodes. The degree of change in the capacitance may indicate various conditions, such as proximity, touch, pressure, and the like.

Capacitive sensing may be used in active electrostatic stylus pens, wherein the stylus pen uses changes in the capacitance to determine pressure. Conventional active electrostatic stylus pens are typically powered by a battery and employ a comparator to detect changes in the capacitance, which consumes a large amount of current, and thus consumes a large amount of power. In devices that are powered by a battery, large current consumption reduces the battery life. Therefore, it may be desired to provide a detection circuit that detects changes in the capacitance and minimizes power consumption.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, drivers, switching devices, current sources, voltage sources, logic gates, semiconductor devices, such as transistors, capacitors, and the like, which may carry out a variety of functions. In addition, the present technology may be integrated in any number of electronic systems, such as automotive, aviation, "smart devices," portables, and consumer electronics, and the systems described are merely exemplary applications for the technology.

Figure 1:
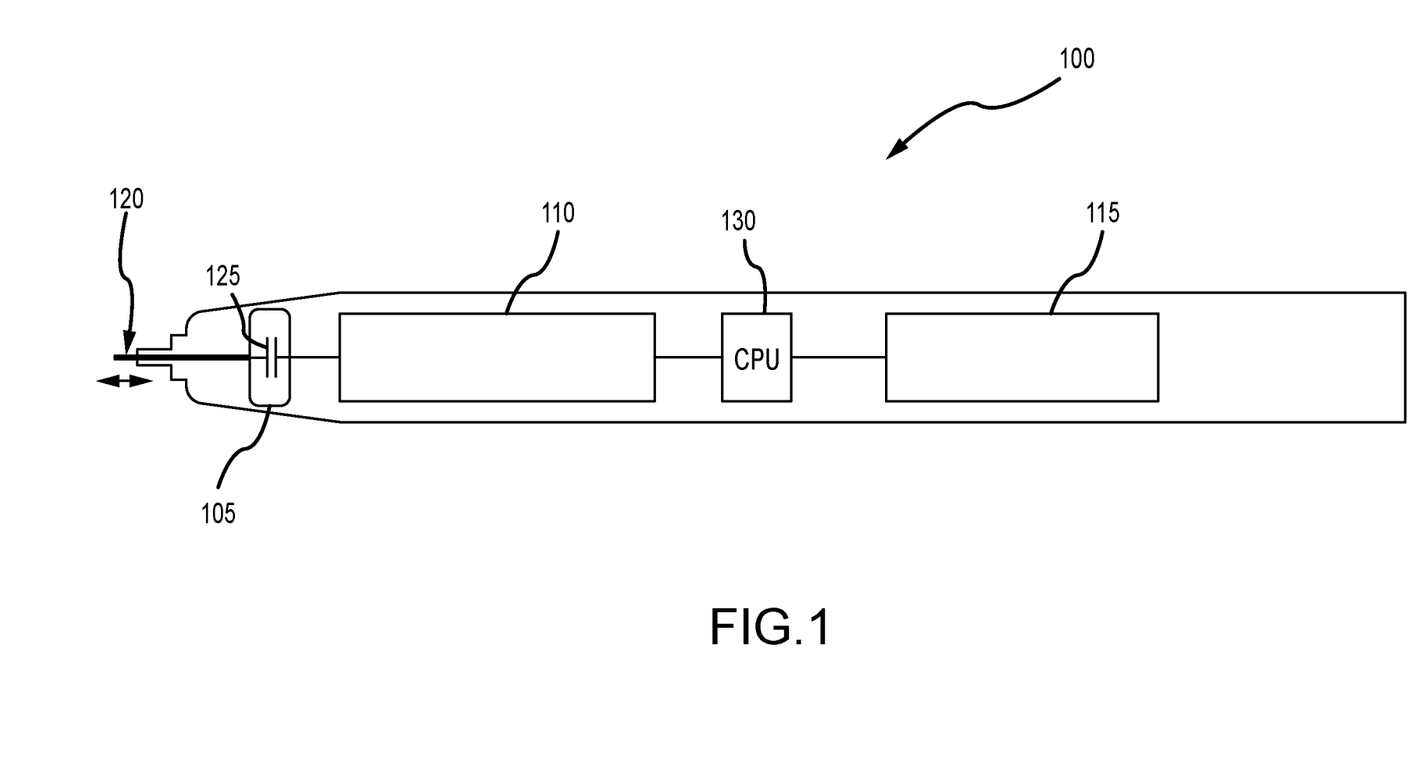
FIG. 1 representatively illustrates an active electrostatic stylus pen in accordance with an exemplary embodiment of the present technology.
Figure 2:
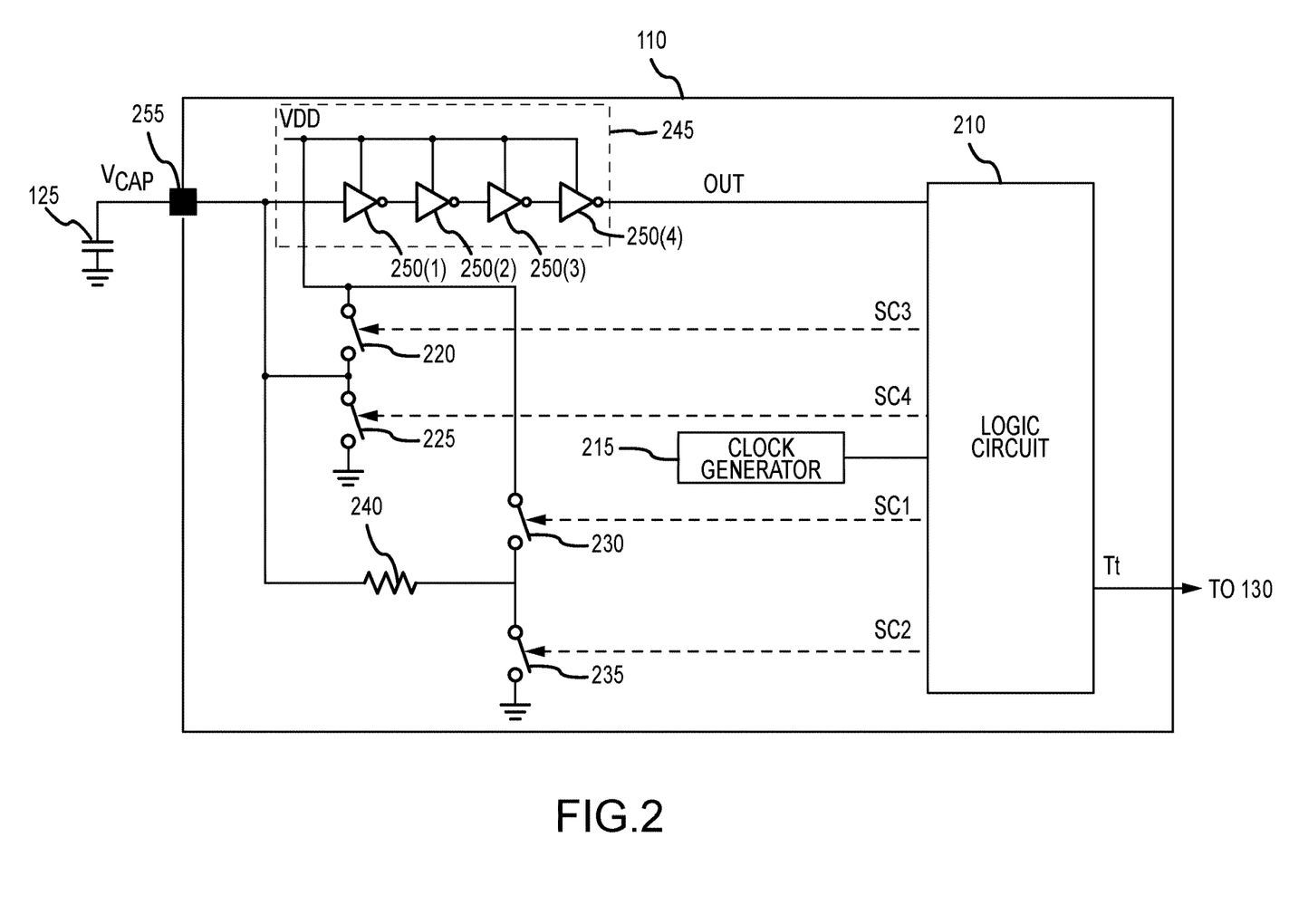
FIG. 2 is a sensing circuit in accordance with various embodiments of the present technology.

Referring to FIGS. 1 and 2, embodiments of the present technology may be integrated in an active electrostatic (AES) stylus pen 100 to detect changes in an input capacitance Cin (i.e., an input signal), compute the input capacitance and use the computed input capacitance to determine pressure at a tip 120 of the AES pen 100, as the input capacitance Cin and pressure are directly proportional to each other.

In an exemplary embodiment, the AES pen 100 may comprise a capacitive pressure sensor 105 located near the tip 120 of the AES pen 100. The capacitive pressure sensor 105 may comprise any circuit and/or device suitable for measuring pressure by detecting changes in electrical capacitance caused by movement of the tip 120. For example, the capacitive pressure sensor 105 may comprise a capacitor 125 that has a variable capacitance. The input capacitance Cin may represent the capacitance of the capacitive pressure sensor 105, which varies according to the amount of pressure (force) applied to the tip 120 of the AES pen 100. For example, as pressure at the tip 120 increases, the input capacitance Cin increases and vice versa. Embodiments of the present technology may utilize the input capacitance Cin to assign a pressure value to the AES pen 100 during use.

In an exemplary embodiment, the AES pen 100 may be powered by a battery 115, such as a rechargeable battery. The battery 115 may provide power to various components and/or circuits within the AES pen 100. The battery 115 may comprise any suitable battery type, such as a lithium ion battery.

In various embodiments, the AES pen 100 may communicate with a host device (not shown), such as a touch screen. For example, the AES pen 100 may be equipped with various wired and/or wireless communication systems, such as Bluetooth communication for wireless communication and a USB port for wired communication. The AES pen 100 may communicate pressure signals to the host device through the wired and/or wireless communication systems.

In various embodiments, the AES pen 100 may comprise a central processing unit 130, microprocessor, or other suitable processor to execute instructions, perform arithmetic functions, input/output operations, and the like.

In an exemplary embodiment, the AES pen 100 may further comprise a sensing circuit 110 configured to detect or otherwise sense an input voltage Vcap of the capacitor 125, wherein the input voltage Vcap is inversely proportional to the input capacitance Cin. For example, the sensing circuit 110 may comprise an input terminal 255 connected to the capacitor 125. The sensing circuit 110 may be configured to measure one or more time periods based on known and observed events and use the one or more time periods to compute the capacitance value Cin.

In an exemplary embodiment, the sensing circuit 110 may comprise a sub-circuit 245 connected to the input terminal 255 and responsive to the input voltage Vcap. For example, the sub-circuit 245 may generate an output signal OUT that is based on the input voltage Vcap. In an exemplary embodiment, the output signal OUT may have a LOW value (e.g., a digital '0') or a HIGH value (e.g., a digital '1').

The sub-circuit 245 may comprise one or more inverters, such as a first inverter 250(1), a second inverter 250(2), a third inverter 250(3), and a fourth inverter 250(4). The sub-circuit 245 may comprise any number of inverters 250. In the case where the sub-circuit 245 comprises multiple inverters, the inverters may be connected in series with each other. Each inverter 250 may be realized using CMOS transistors, and thus has a threshold voltage $V_{TH}$ characteristic (also referred to as a switching threshold) that describes the voltage level at which the output of the inverter changes from LOW to HIGH or HIGH to LOW based on changes in the input voltage Vcap. In an exemplary embodiment, an inverter 250 is directly connected to the input terminal 255. Using an inverter at the input of the sensing circuit 110 eliminates the need to provide a static current, which is required in conventional sensing circuits that employ a comparator at the input.

In an exemplary embodiment, the sub-circuit 245 may be connected to a supply voltage $V_{DD}$. For example, each inverter 250 may receive the supply voltage $V_{DD}$ through a supply voltage line.

The sensing circuit 110 may further comprise a plurality of switches, such as a first switch 230, a second switch 235, a third switch 220, and a fourth switch 225. The first and second switches 230, 235 may be connected in series with each other and may be connected between the supply voltage line and a ground. The third and fourth switches 220, 225 may be connected in series with each other and may be connected between the supply voltage line and the ground. Each switch may be realized by a transistor or any other suitable switching device. In addition, each switch may be an active-high input device or active-low input device.

The first switch 230 may be responsive to a first control signal SC1, the second switch 235 may be responsive to a second control signal SC2, the third switch 220 may be responsive to a third control signal SC3, and the fourth switch 225 may be responsive to a fourth control signal SC4. In particular, the control signals may control enabling/disabling (ON/OFF) operation of the switches. For example, if the switches are active-high input devices, when the first control signal SC1 is LOW, the first switch 230 is OFF (open, disabled), and alternatively, when the first control signal SC1 is HIGH, the first switch 230 is ON (closed, enabled).

Similarly, when the second control signal SC2 is LOW, the second switch 235 is OFF (open, disabled), and alternatively, when the second control signal SC2 is HIGH, the second switch 235 is ON (closed, enabled).

Similarly, when the third control signal SC3 is LOW, the third switch 220 is OFF (open, disabled), and alternatively, when the third control signal SC3 is HIGH, the third switch 220 is ON (closed, enabled).

Similarly, when the fourth control signal SC4 is LOW, the fourth switch 225 is OFF (open, disabled), and alternatively, when the fourth control signal SC4 is HIGH, the fourth switch 225 is ON (closed, enabled).

The sensing circuit 110 may further comprise a clock generator 215 configured to generate a reference clock signal CLK. In an exemplary embodiment, the clock generator 215 may comprise an RC oscillator circuit using an RC network and a combination of resistors and capacitors (not shown). In other embodiments, however, the clock generator may comprise any suitable circuit and/or device for generating a clock signal.

The sensing circuit 110 may further comprise a logic circuit 210 configured to control the switches (e.g., switches 230, 235, 220, 225) according to the reference clock signal CLK. For example, the logic circuit 210 may generate the first control signal SC1, the second control signal SC2, the third control signal SC3, and the fourth control signal SC4, and may transmit each to the respective switch.

The logic circuit 210 may be connected to an output terminal of the inverter 250 (or the terminus inverter, in a case of multiple inverters) and configured to receive the output signal OUT.

Figure 3:
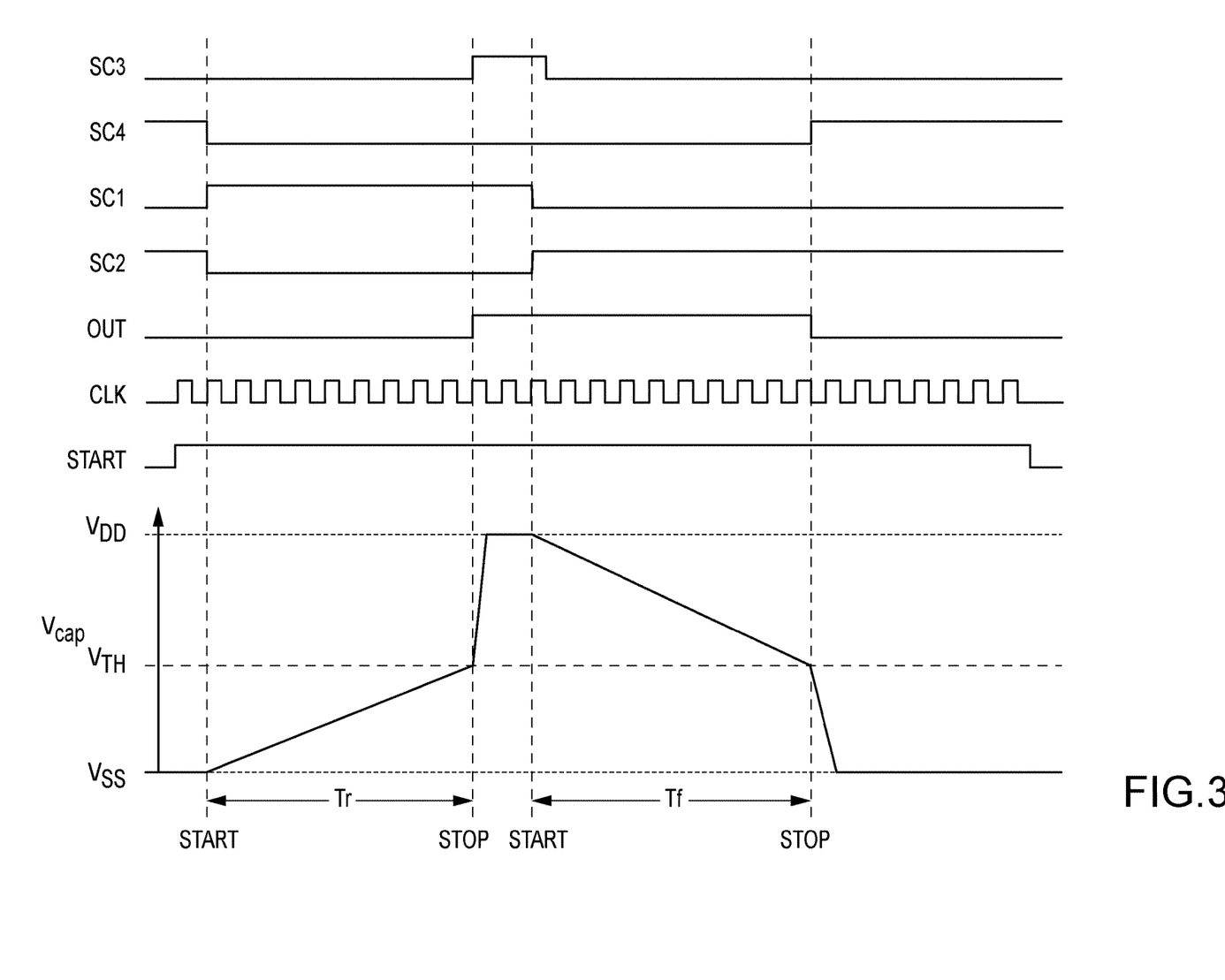
FIG. 3 is a timing diagram for the circuit of FIG. 2 in accordance with a various embodiments of the present technology.

Referring to FIGS. 2 and 3, the logic circuit 210 may also measure one or more time periods based on the reference clock signal CLK and/or detected events. For example, the logic circuit 210 may comprise a time-to-digital converter 260 (or other suitable time-measuring circuit) to measure an elapsed time according to the reference clock signal CLK. In an exemplary embodiment, the time-to-digital converter (TDC) 260 may measure a first period Tr (also referred to as a charging time) and a second period Tf (also referred to as a discharging time).

The first period Tr may be defined according to the first control signal SC1 and the output signal OUT. In one embodiment, the first period Tr is defined by a start point marked by a transition edge (e.g., a rising edge or a falling edge) of the first control signal SC1 and an end point marked by a transition edge (e.g., a rising edge or a falling edge) of the output signal OUT. The TDC 260 may output the first period Tr as a digital value.

The second period Tf may be defined according to the second control signal SC2 and the output signal OUT. In one embodiment, the second period Tf is defined by a start point marked by a transition edge (e.g., a rising edge or a falling edge) of the second control signal SC2 and an end point marked by a transition edge (e.g., a rising edge or a falling edge) of the output signal OUT. The TDC 260 may output the second period Tf as a digital value.

In various embodiments, a rising edge is defined as a transition from a LOW (L) value to a HIGH (H) value and a falling edge is defined as a transition from a HIGH value to LOW value.

In one embodiment, the logic circuit 210 may compute a total time Tt, wherein the total time Tt is the sum of the first period Tr and the second period Tf (i.e., Tt=Tr+Tf). In an alternative embodiment, the logic circuit 210 may transmit the first period Tr and the second period Tf to the CPU 130, and the CPU 130 may compute the total time Tt. For example, the logic circuit 210 and/or the CPU 130 may comprise an adder circuit (not shown) configured to sum two values.

Figure 4:
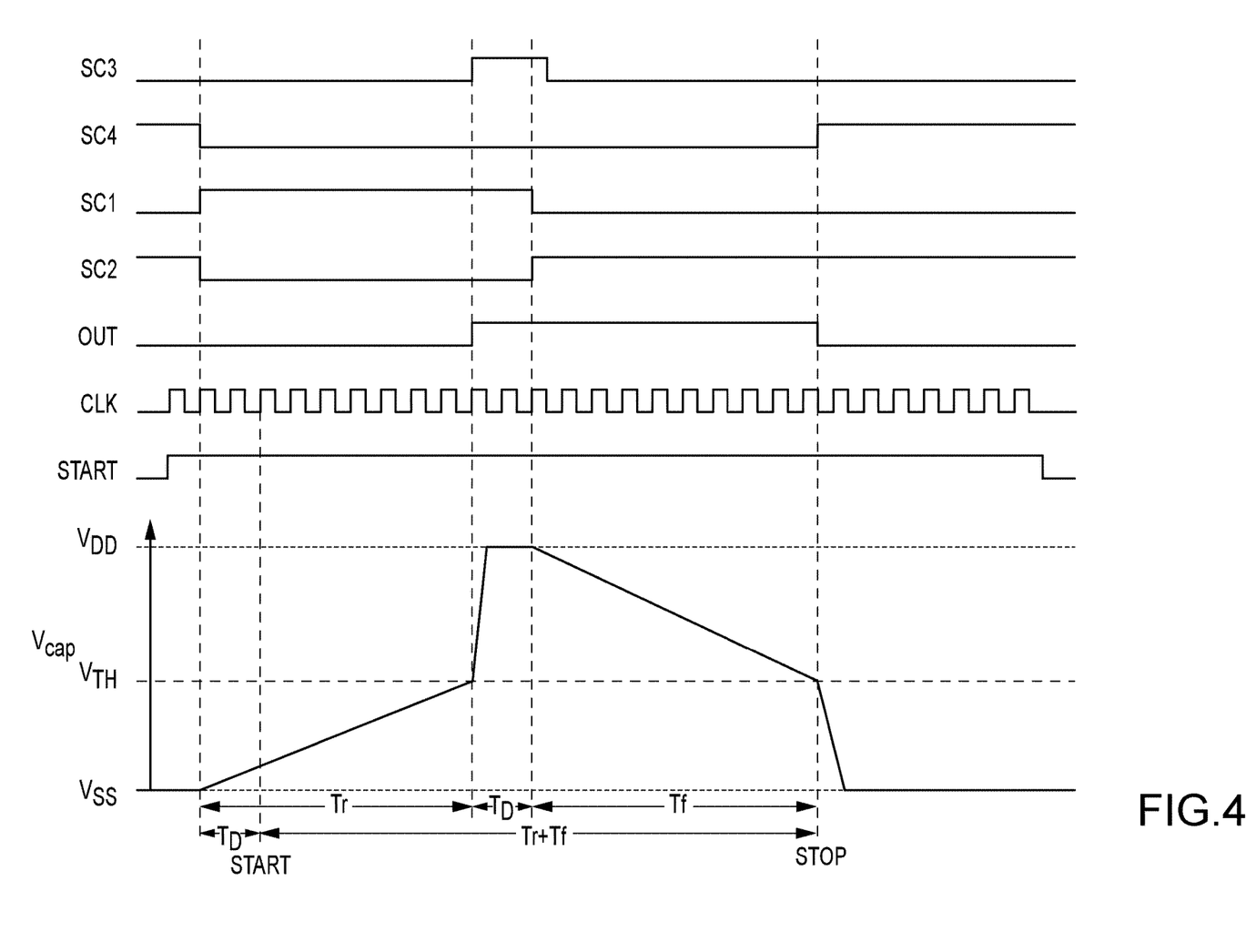
FIG. 4 is an alternative timing diagram for the circuit of FIG. 2 in accordance with various embodiments of the present technology.

In an alternative embodiment, the logic circuit 210 may measure the total time Tt with the TDC 260 in one continuous measurement operation. In the present case, the TDC 260 starts counting after a time delay $T_D$ and stops counting at the second transition edge of the output signal OUT.

In one embodiment, the logic circuit 210 may transmit the first period Tr and the second period Tf values to the CPU 130. The CPU 130 may use the first period Tr and second period Tf values to compute the input capacitance Cin. For example, the CPU 130 may be configured to calculate the input capacitance Cin according to the following equation: Cin=(Tr+Tf)/1.4×Rref, wherein Rref is a resistance of a reference resistor 240. The resistance resistor 240 may be connected to the input terminal 255 and to a node positioned between the first switch 230 and the second switch 235.

Alternatively, the logic circuit 210 may transmit the total time Tt to the CPU 130, wherein the CPU computes the input capacitance Cin according to the following: Cin=Tt/(1.4×Rref).

In operation, and referring to FIGS. 1-4, the system may detect and measure the charging time Tr of the capacitor 125 and the discharging time Tf of the capacitor 125. The charging time Tr together with the discharging time Tf may be used to compute the capacitance Cin of the capacitor 125, which may be used to determine a pressure value that corresponds to the pressure applied at the tip 120 of the AES pen 100. In general, if a strong pressure is applied to the tip 120, the input capacitance Cin increases, and as a result, during charging and discharging, the voltage Vcap increases and decreases slowly, thus the first period Tr and second period Tf will be longer compared to a weak pressure condition. Conversely, if a weak pressure is applied to the tip 120, the input capacitance Cin decreases, and as a result, the voltage Vcap increases and decreases more quickly, thus the first period Tr and second period Tf will be shorter compared to the strong pressure condition.

In an exemplary operation, and referring to FIGS. 1-3 and 5, the system may start with an initial set of conditions (500), wherein first switch 230 and the third switch 220 are OFF (open), the second switch 235 and the fourth switch 225 are ON (closed), the voltage Vcap is at a reference voltage $V_{SS}$ (e.g., 0 volts), and the output signal OUT is LOW. To achieve these conditions, the first and third control signals SC1, SC3 may be LOW, and the second and fourth control signal SC2, SC4 may be HIGH.

Figure 5:
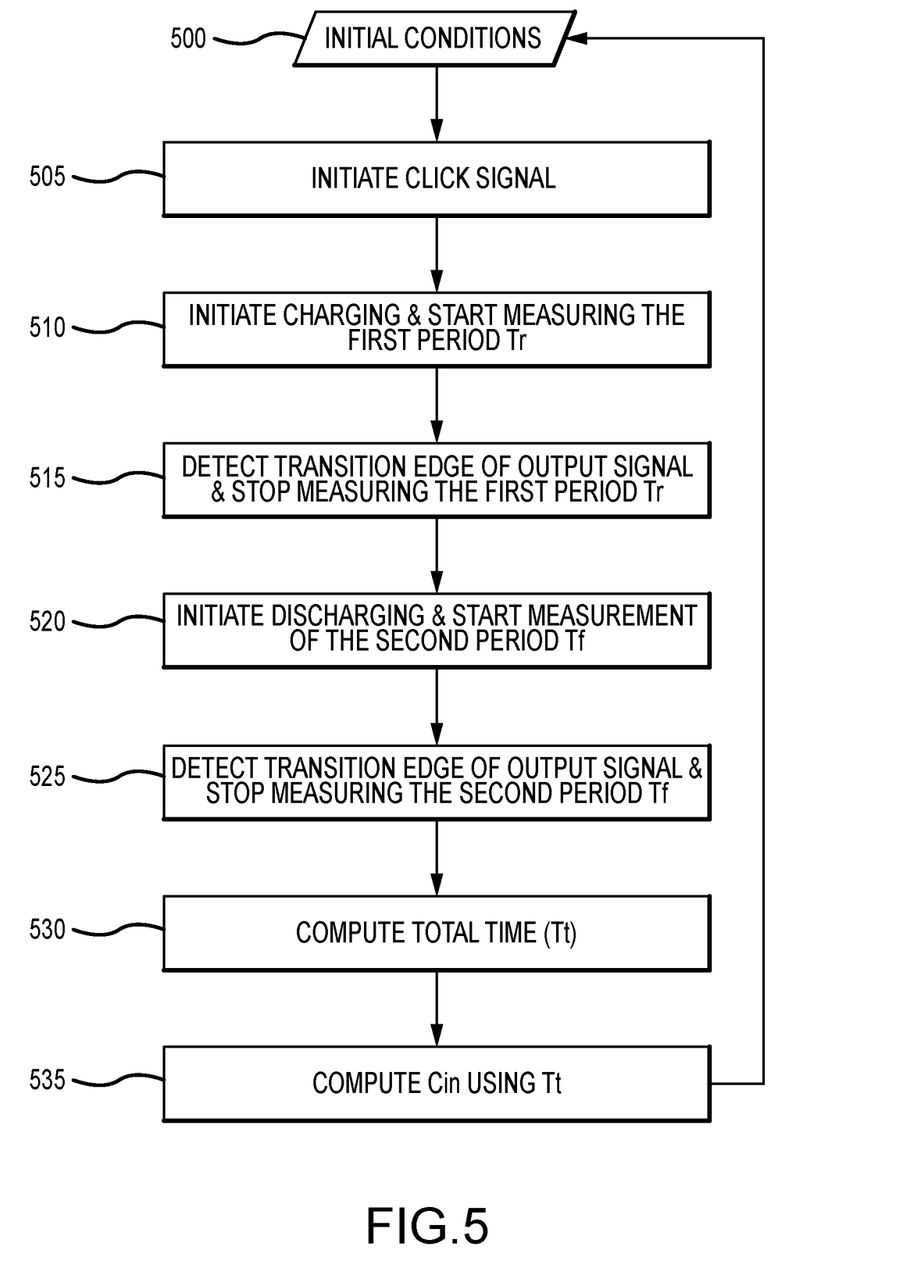
FIG. 5 is a flow chart for computing capacitance in accordance with various embodiments of the present technology.

The logic circuit 210 may then generate a start signal to initiate the reference clock signal CLK (505).

The logic circuit 210 may then initiate charging of the capacitor 125 and start measuring the first period Tr (510). During the first period Tr, the input voltage Vcap increases from the reference voltage $V_{SS}$ level to the threshold voltage $V_{TH}$ level. To initiate charging, the logic circuit 210 may close (turn ON) the first switch 230 and open (turn OFF) the second switch 235 via the first and second control signals SC1, SC2, respectively. For example, the first control signal SC1 may transition from LOW to HIGH (referred to as rising edge) and the second control signal, SC2 may transition from HIGH to LOW (referred to as a falling edge). The first control signal SC1 may transition slightly before (or simultaneously with) the second control signal SC2. In an exemplary embodiment, the TDC 260 may be enabled (started) to measure the first period Tr when the first control signal SC1 transitions from one value to another.

The logic circuit 210 may then detect a transition edge (e.g., a rising edge or a falling edge) of the output signal OUT (515). When the input voltage Vcap is equal to the threshold voltage $V_{TH}$, the output signal OUT transitions from HIGH to LOW (or LOW to HIGH), and the transition edge of the output signal OUT may indicate the end of the first period Tr. In an exemplary embodiment, the TDC 260 may detect the value of the output signal OUT and may stop measuring the first period Tr when the output signal OUT transitions from one value to another. In other words, the end of the first period Tr is coincident with the transition edge of the output signal OUT. The TDC 260 may convert the measured first period Tr to a digital value.

A predetermined time delay $T_D$ may be provided between the first period Tr and the second period Tf. The predetermined time delay $T_D$ begins immediately after the first period Tr ends (at the transition edge of the output signal OUT). The duration of the predetermined time delay $T_D$ is set to ensure that the capacitor 125 is charged to the supply voltage level $V_{DD}$ before the discharge operation begins. For example, the duration of the time delay $T_D$ may be one to two clock cycles and depends on a maximum capacitance of the capacitor 125.

The logic circuit 210 may then initiate discharging of the capacitor 125 and start measuring the second period Tf (520). During the second period Tf, the input voltage Vcap decreases from the supply voltage $V_{DD}$ level to the threshold voltage $V_{TH}$ level. To initiate discharging, the logic circuit 210 may open (turn OFF) the first switch 230 and close (turn ON) the second switch 235 via the first and second control signals SC1, SC2, respectively. For example, the first control signal SC1 may transition from HIGH to LOW and the second control signal, SC2 may transition from LOW to HIGH. The first control signal SC1 may transition slightly before (or simultaneously with) the second control signal SC2. In an exemplary embodiment, the TDC 260 may be enabled (started) to measure the second period Tf when the second control signal SC2 transitions from one value to another. In other words, the starting point of the second period Tf is coincident with the transition edge of the second control signal SC2.

The logic circuit 210 may then detect a transition edge (e.g., a falling edge) of the output signal OUT (525). The transition edge of the output signal OUT is coincident with the time at which the input voltage Vcap is equal to the threshold voltage $V_{TH}$ and may indicate the end of the second period Tf. In an exemplary embodiment, the TDC 260 may detect the value of the output signal OUT and may stop measuring the second period Tf when the output signal OUT transitions from one value to another. The TDC 260 may convert the measured second period Tf to a digital value.

The direction of transition (i.e., rising or falling) of the output signal OUT when the input voltage Vcap equals the threshold voltage $V_{TH}$ is based on the total number of inverters 250. For example, if the sub-circuit 245 comprises an odd number (e.g., 1, 3, etc.) of inverters 250, then the end of the first period Tr will be marked by a falling edge of the output signal OUT and the end of the second period Tf will be marked by a rising edge of the output signal OUT. If the sub-circuit 245 comprises an even number (e.g., 2, 4, etc.) of inverters 250, then the end of the first period Tr will be marked by a rising edge of the output signal OUT and the end of the second period Tf will be marked by a falling edge of the output signal.

The logic circuit 210 may compute a total time Tt (530), where the total time is the sum of the first period Tr and the second period Tf (i.e., Tt=Tr+Tf). The logic circuit 210 may transmit the total time Tt or the first and second periods Tr, Tf, individually, to the CPU 130. The logic circuit 210 may repeat steps 500-530 for any number of cycles.

The CPU 130 may use the total time Tt or the first and second periods Tr, Tf to compute the input capacitance Cin (535), wherein Cin=(Tr+Tf)/1.4×Rref. The CPU 130 may then assign a pressure value to the computed input capacitance Cin. For example, a higher pressure value may be assigned to a higher input capacitance value, indicating a greater amount of pressure (force) on the tip 120 of the AES stylus pen 100 from the user. Conversely, a lower pressure value may be assigned to a lower input capacitance, indicating a lesser amount of pressure on the tip 120. The CPU 130 may then communicate the pressure value to the host device (e.g., the touch screen) via any suitable communication system, such as the wireless connection or the wired connection.

In an alternative operation, and referring to FIGS. 1-2 and 4, the total time Tt may be determined by starting the TDC 260 after the time delay $T_D$ and continuously measuring the elapsed time until the output signal OUT transitions from HIGH to LOW (or LOW to HIGH). The time delay $T_D$ may be predetermined (e.g., one to two clock cycles) and may be set to ensure sufficient time for the capacitor 125 to charge from the inverter threshold value $V_{TH}$ to the supply voltage $V_{DD}$, which may be based on a maximum capacitance of the capacitor 125 and the resistance of the first switch 230. For example, as the maximum capacitance and/or resistance increases, the time delay increases.

In the present operation, the TDC 260 may convert the total time Tt to a digital value and transmit the digital total time Tt to the CPU 260. The CPU 260 may compute the input capacitance Cin according to the following: Cin=Tt/(1.4×Rref).

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A sensing circuit, comprising:
   an input terminal capable of receiving an input signal;
   a sub-circuit connected to the input terminal and configured to generate an output signal at an output terminal, wherein the sub-circuit comprises an inverter;
   a logic circuit connected to the output terminal and configured to generate a first control signal and a second control signal according to a reference clock signal;
   a first switch connected to the inverter and responsive to the first control signal; and
   a second switch connected to the inverter and responsive to the second control signal;
   wherein the logic circuit is configured to:
      measure a total time period, wherein the total time period comprises:
         a first period defined according to the first control signal and the output signal; and
         a second period defined according to the second control signal and the output signal, wherein the second period is later in time than the first period; and
      compute a capacitance value based on the total time period, wherein the capacitance value is directly proportional to the total time period.

2. The sensing circuit according to claim 1, wherein the first period is defined by a start point marked by a rising edge of the first control signal and an end point marked by a transition edge of the output signal.

3. The sensing circuit according to claim 1, wherein the second period is defined by a start point marked by a rising edge of the second control signal and an end point marked by a transition edge of the output signal.

4. The sensing circuit according to claim 1, further comprising an RC oscillator connected to the logic circuit and configured to generate the reference clock signal.

5. The sensing circuit according to claim 1, wherein the input signal is inversely proportional to a capacitance value.

6. The sensing circuit according to claim 1, wherein the first period is defined by a start point marked by enabling the first switch and an end point marked by a transition of the output signal.

7. The sensing circuit according to claim 1, wherein the second period is defined by a start point marked by enabling the second switch and an end point marked by a transition of the output signal.

8. The sensing circuit according to claim 1, wherein, during the first period, the input signal is increasing in value and the output signal transitions from a low value to a high value when the input signal equals a threshold voltage of the inverter.

9. The sensing circuit according to claim 1, wherein, during the second period, the input signal is decreasing in value and the output signal transitions from a high value to a low value when the input signal equals a threshold voltage of the inverter.

10. A method for computing a capacitance value using a sensing circuit having an inverter, comprising:
   receiving an input voltage at an input terminal of the inverter;
   generating an output signal with the inverter, wherein the output signal is based on the input voltage;

generating a first event defined by a transition edge of a first control signal, wherein the first control signal controls operation of the inverter;

identifying a second event defined by a transition edge of the output signal;

measuring a total time period, wherein a starting point of the total time period is based on the first event and an ending point of the total time period is coincident with the second event; and computing the capacitance value based on the total time period, wherein the capacitance value is directly proportional to the total time period.

11. The method according to claim 10, wherein the total time period comprises:

a first period defined by a start point marked by a rising edge of the first control signal and an end point marked by a rising edge of the output signal; and a second period defined by a start point marked by a rising edge of the second control signal value and a falling edge of the output signal.

12. The method according to claim 11, wherein, during the first period, the input signal is increasing in value and the output signal transitions from a low value to a high value when the input signal equals a threshold voltage of the inverter.

13. The method according to claim 11, wherein, during the second period, the input signal is decreasing in value and the output signal transitions from a high value to a low value when the input signal equals a threshold voltage of the inverter.

14. The method according to claim 10, wherein:

the starting point of the total time period is coincident with the first event; and measuring the total time period is intermittent.

15. The method according to claim 10, wherein:

the starting point of the total time period is later in time than the first event; and measuring the total time period is continuous.

16. A system, comprising:

a pressure sensor circuit for detecting pressure, wherein a capacitance of the pressure sensor varies according to the detected pressure; and a sensing circuit connected to the pressure sensor circuit and configured to sense an input voltage that is inversely proportional to the capacitance, wherein the sensing circuit comprises:

a plurality of inverters connected in series with each other and configured to generate an output signal at an output terminal according to the input voltage;

a clock generator configured to generate a reference clock signal;

a logic circuit connected to the output terminal and configured to generate a first control signal and a second control signal according to the reference clock signal, wherein the first and second control signals control operation of the plurality of inverters;

wherein the logic circuit is configured to:

measure a total time period, wherein a starting point of the total time period is based on the first control signal and an ending point of the total time period is coincident with a transition edge of the output signal; and compute the capacitance based on the total time period, wherein the capacitance is directly proportional to the total time period.

17. The system according to claim 16, wherein the total time period is measured according to a first period defined by a start point marked by a rising edge of the first control signal and an end point marked by a rising edge of the output signal.

18. The system according to claim 17, wherein the starting point of the total time period is coincident with the rising edge of the first control signal.

19. The system according to claim 17, wherein the starting point of the total time period is later in time than the rising edge of the first control signal by a multiple of the reference clock signal.

20. The system according to claim 16, wherein the total time period is measured according to a second period defined by a start point marked by a rising edge of the second control signal value and an end point marked by a falling edge of the output signal.

* * * * *